United States Patent [19]

Romagnoli

[11] Patent Number: 4,506,495

[45] Date of Patent: Mar. 26, 1985

[54] MACHINE FOR PRODUCING BLISTER PACKAGES

[75] Inventor: Andrea Romagnoli, San Lazzaro di Savena, Italy

[73] Assignee: IMA-Industria Macchine Automatiche S.p.A., Ozzano Emilia, Italy

[21] Appl. No.: 341,332

[22] Filed: Jan. 21, 1982

[30] Foreign Application Priority Data

Jan. 23, 1981 [IT] Italy .................. 3313 A/81

[51] Int. Cl.³ ............................................. B65B 47/08
[52] U.S. Cl. ..................................................... 53/559
[58] Field of Search ................ 53/559, 560, 453, 454, 53/282, 141, 201, 51; 425/182, 183, 193, 195, 387.1, 388

[56] References Cited

U.S. PATENT DOCUMENTS

| | | | |
|---|---|---|---|
| 3,244,779 | 4/1966 | Levey et al. | 53/559 X |
| 3,427,687 | 2/1969 | Miller | 425/195 |
| 3,431,601 | 3/1969 | Lipscomb | 425/195 |
| 3,464,182 | 9/1969 | Nichols | 53/559 |
| 3,775,932 | 12/1973 | Jeney | 53/201 X |
| 3,808,772 | 5/1974 | Turtschan | 53/559 X |
| 4,094,127 | 6/1978 | Romagnoli | 53/559 X |

Primary Examiner—Robert L. Spruill
Assistant Examiner—Donald R. Studebaker
Attorney, Agent, or Firm—Karl F. Ross; Herbert Dubno

[57] ABSTRACT

A machine for producing blister packages have several interchangeable dies with cavities, vented to the atmosphere, that differ in shape but have identical rim zones open toward an abutment plate through which compressed air is admitted for deforming a preheated thermoplastic carrier strip periodically pressed against that plate by the reciprocating die. The blisters thus formed in the carrier strip are filled with goods to be packaged and are then engaged by a transport wheel with peripheral indentations fitting around the invariable rim zones thereof, these indentations being separated by webs coacting with a counterroller to heat-seal the carrier strip onto an overlying metallic cover strip. Another, similarly indented transport wheel downstream of the sealing station, operating in a different rhythm, feeds the resulting composite tape to a die cutter dividing same into individual packages each having one or more rows of blisters.

4 Claims, 10 Drawing Figures

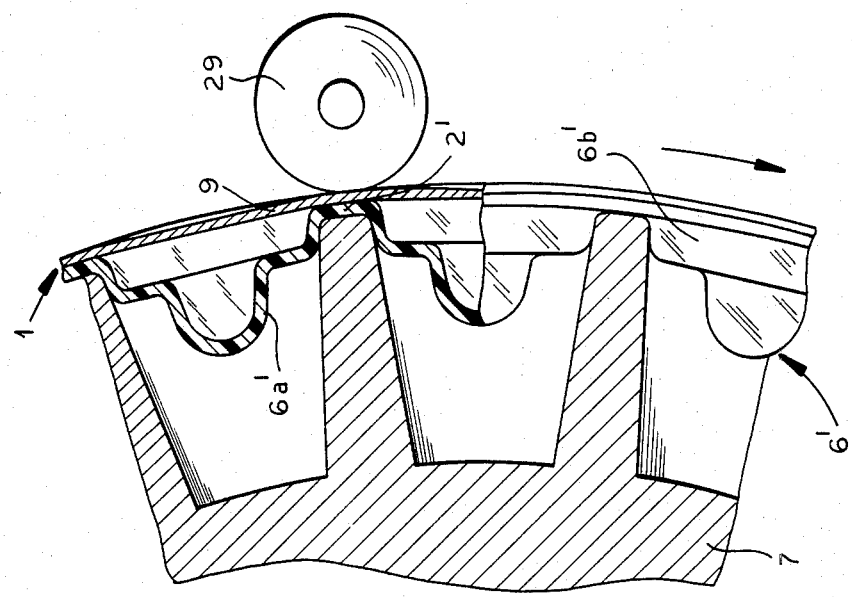
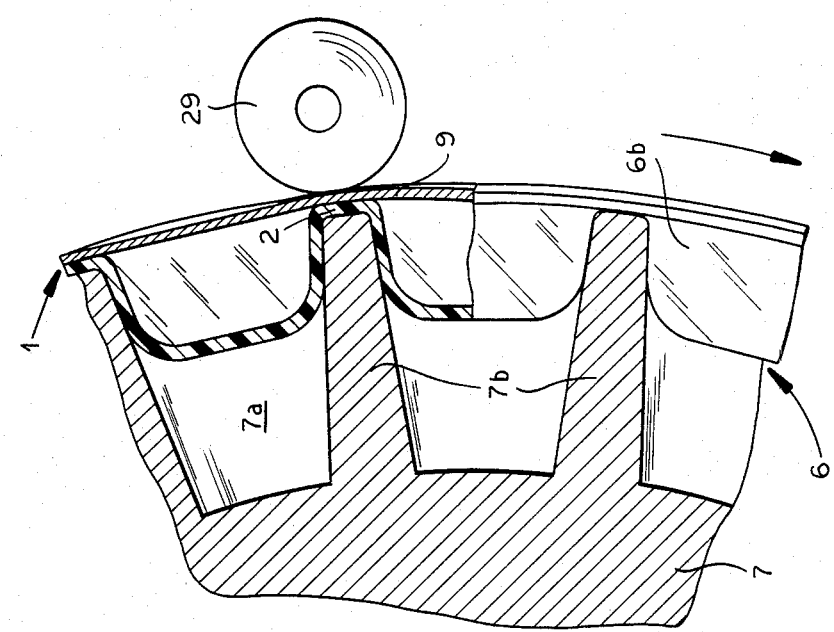

MACHINE FOR PRODUCING BLISTER PACKAGES

FIELD OF THE INVENTION

My present invention relates to a machine for the production of so-called blister packages from a thermoplastic carrier strip which, after preheating, is subjected to a deep-drawing operation in a molding station whereupon the resulting cells or blisters are filled with goods to be packaged, these cells being then sealed by a bonding of the carrier strip to an overlying cover strip which is usually metallic.

BACKGROUND OF THE INVENTION

In such machines the forming of the blisters in the preheated and therefore readily deformable carrier strip is generally done with the aid of a source of compressed air driving portions of that strip into suitably shaped cavities or recesses of an underlying die whose bottoms are vented to the atmosphere. The die, acting as a movable mold plate, may be periodically reciprocated toward and away from a fixed abutment plate having air channels aligned with these cavities. After the deformed strip leaves the die, and upon sufficient hardening of the blisters, the latter may be engaged by stationary guides as well as by one or more peripherally indented transport rollers for advancing the strip in a precisely controlled manner through the filling and sealing stations following the molding station. After the filled blisters have been hermetically sealed by the application of the cover strip, the resulting composite tape may be divided at a cutting station into packages of one or more blisters each. The sealing station may include one or more counterrollers coacting with one of the aforementioned transport rollers to laminate the cover strip to the underlying carrier strip, with or without the application of additional heat.

The size and shape of the blisters depend, of course, on the configuration of the goods to be packaged or, in the case of a liquid or paste, on the volume to be enclosed in each blister. Changing from one shape to another, aside from requiring the use of a different die in the molding station, generally necessitates also the replacement of the indented transport roller or rollers by others conforming to the new shape. Similarly, guide ribs disposed between the advancing blisters may have to be rearranged or exchanged.

OBJECT OF THE INVENTION

Thus, the object of my present invention is to provide means in such a packaging machine for allowing the same transport rollers and guide means to be used with blisters of widely varying shapes.

SUMMARY OF THE INVENTION

I realize this object, in accordance with my present invention, by providing the machine with a plurality of dies alternatively positionable on a holder therefor, these dies having cavities or recesses that differ in shape but have identical rim zones wider than the remainder of each cavity. The identical rim zones, remote from the vented bottoms of the cavities, serve to form invariable base portions of the resulting blisters which closely fit into the indentations of a transport roller and can also be received between fixed guide ribs extending parallel to the direction of advance.

BRIEF DESCRIPTION OF THE DRAWING

The above and other features of my invention will now be described with reference to the accompanying drawing in which:

FIG. 8 is a fragmentary sectional view of a transport roller coacting with a counterroller in a sealing station in which the carrier strip of FIGS. 4 and 5 is being bonded to a cover strip;

FIG. 9 is a view similar to FIG. 8 but relating to the carrier strip of FIGS. 6 and 7.

SPECIFIC DESCRIPTION

Figure 1:
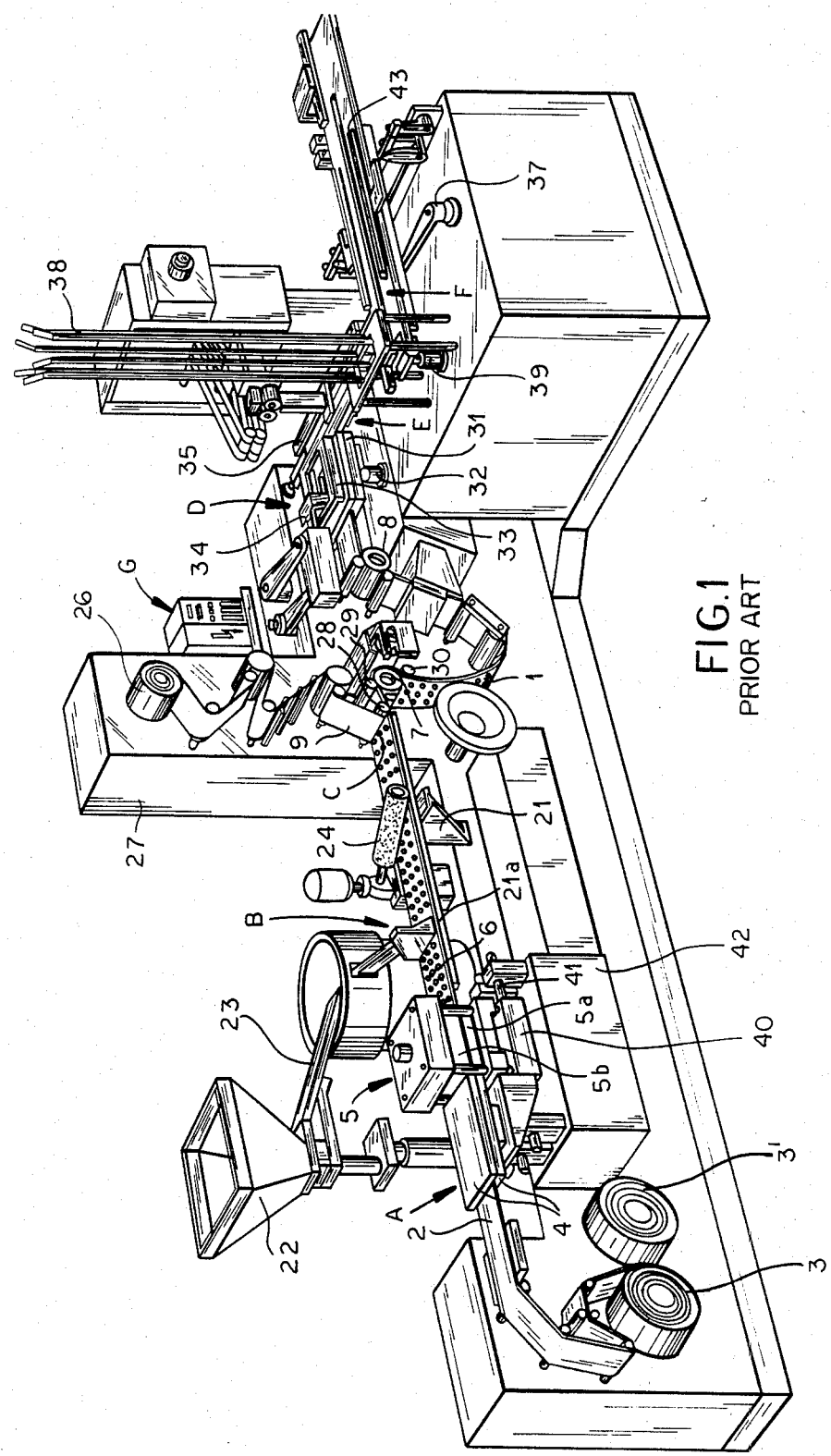
FIG. 1 is a perspective view of a packaging machine to which my invention is applicable.

In FIG. 1 I have shown a packaging machine, of a type largely known per se, wherein a thermoplastic carrier strip 2 (e.g. of polyvinylchloride) advances successively through a molding station A, a filling station B, a sealing station C, a cutting station D, a labeling station E and a cartoning station F. Carrier strip 2, drawn from a supply reel 3 which after exhaustion is replaced by a similar reel 3′, passes through a preheating stage 4 of station A before being subjected to a deep-drawing operation in a mold 5 more fully described hereinafter with reference to FIGS. 2 and 3. This mold, which includes a die 5a and an abutment plate 5b, produces in strip 2 successive rows of blisters 6 which pass between guide ribs 21a (FIGS. 4–7) of a support 21 as the strip moves horizontally through a filling station B to sealing station C. Mold 5 is mounted on a carriage 40 for reciprocation, by suitable drive means or through entrainment by strip 2 against the force of a restoring spring or the like, along rails 41 of a base 42. Filling station B comprises a hopper 22 from which the goods to be packaged are discharged via a feed channel 23 into the upwardly open blisters 6; the strip 2 then passes underneath a settling roller 24 which packs the goods into these blisters. In station C the loaded carrier strip 2 is engaged by a continuously driven transport roller 7 together with a cover strip 9, e.g. of aluminum foil, drawn from a supply reel 26 on a transmission housing 27. Strip 9, after passing around a deflecting roller 28, moves together with strip 2 between transport roller 7 and two counterrollers 29, 30 for hot lamination onto strip 9 to form a composite tape 1 in whose blisters the goods are hermetically sealed against the atmosphere. An intermittently driven transport roller 8 downstream of roller 7 engages the tape 1 which forms a weighted loop of variable length between the two rollers in order to accommodate differences in their instant speeds, as more fully described hereinafter. Station D, which may be of the type described in my copending application Ser. No. 157,066 filed June 6, 1980, now U.S. Pat. No. 4,317,399, includes a cutting die 31 designed to sever a section with two rows of blisters 6 from tape 1 to form a package. Each package thus stamped from the tape is elevated by a plunger 32 into an overlying frame 33 to form a stack of such packages, these stacks being thereupon intermittently thrust by a horizontal plunger 34 onto a track 35; another plunger then moves to oncoming stacks of packages along this track through station E, where they are provided with identifying legends, into a respective box drawn by a gripper 39 from a stacking device 38 at station F. A swingable arm 37 transports each box along another track 43 for closing and further handling.

A command post G controls the operation of a driving mechanism inside transmission housing 27 which operates all the movable elements of the various stations in proper synchronism. The machine may also include a monitoring system for ascertaining irregularities in its operation, as described in my copending application Ser. No. 341,325 of even date.

Figure 2:
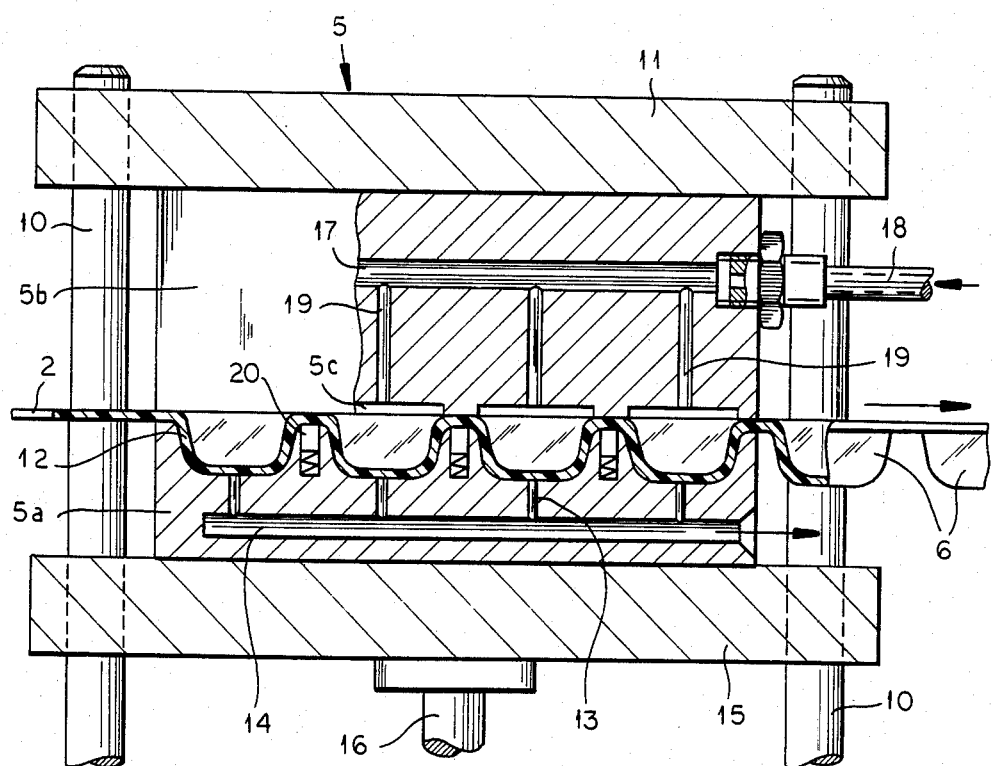
FIG. 2 is a cross-sectional view of a molding station forming part of the machine of FIG. 1.
Figure 3:
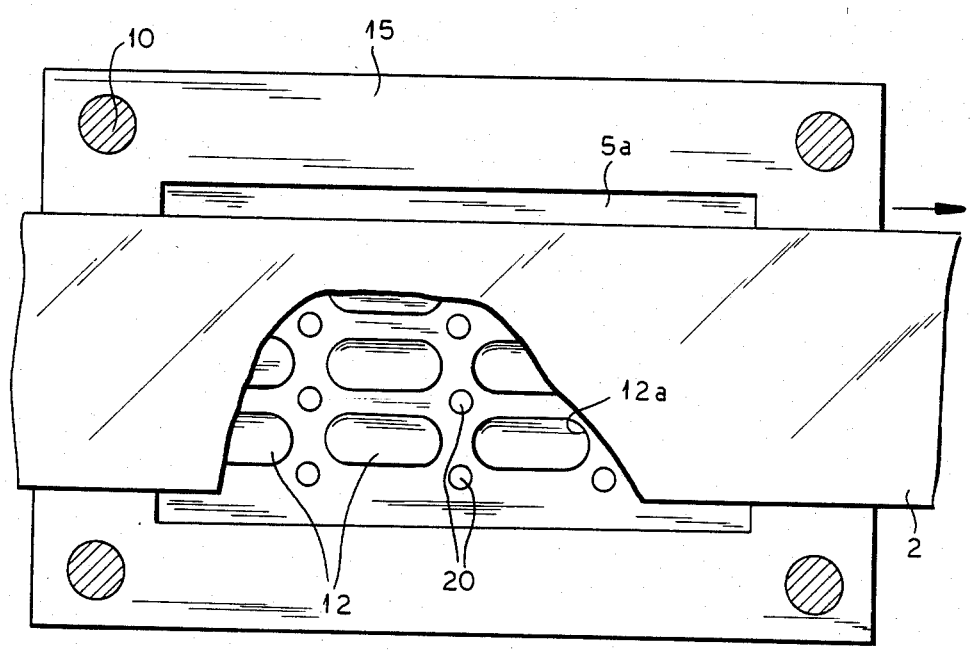
FIG. 3 is a top view of a die and die holder in the molding station of FIG. 2, together with an overlying carrier strip (shown partly broken away)
Figure 4:
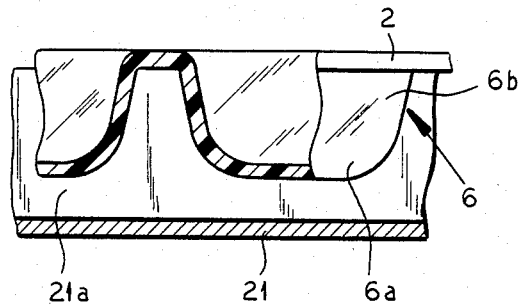
FIG. 4 is a fragmentary side-elevational view, partly in section, of a guide structure and a carrier strip with blisters formed in the die of FIGS. 2 and 3.

As shown in FIGS. 2 and 3, the die 5a of mold 5 rests on a die holder or platen 15 which is vertically reciprocable by a ram 16 along columns 10. This die has a multiplicity of cavities 12, disposed in an orthogonal array of four rows of four cavities each, whose bottoms have venting holes holes 13 opening into the atmosphere via a conduit 14. Abutment plate 5b is mounted on a stationary platen 11 fixedly secured to the columns 10, this plate having a manifold 17 which is connected through a conduit 18 to a nonillustrated source of compressed air and communicates via respective bores 19 with recesses 5c overlying respective cavities 12 of die 5a. When an undeformed portion of the preheated carrier strip 2 comes to lie between this die and plate 5b, that strip portion is clamped between this plate and the die 5a whereupon air admitted via the conduit 18 into manifold 17 deforms the strip to produce blisters 6. Spring-loaded ejector pins 20 located in die 5a between cavities 12 help dislodge the deformed strip portions from the die 5a when the latter is subsequently retracted downwardly.

Figure 5:
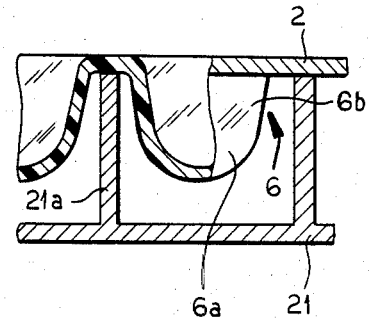
FIG. 5 is a fragmentary cross-sectional view of the guide structure and carrier strip shown in FIG. 4.

The four parallel files of blisters 6 thus produced in strip 2 fit between ribs 21a of support 21, as best seen in FIG. 5, so that the strip is guided with little transverse play on its way past filling station B and settling roller 24 into sealing station C. Each of these blisters has a lower portion 6a narrower that a base portion 6b of generally rectangular outline produced in an upper rim zone of the corresponding die cavity 12. This base portion 6b fits closely into the mouths of peripheral indentations 7a of the continuously driven transport roller 7 (as well as corresponding indentations of the intermittently driven but identical transport roller 8), as illustrated in FIG. 8, so that the strip 2 is positively entrained by the rotating roller; the closed mold 5, shaping four rows of blisters at a time, advances together with strip 2 by four such rows during a fraction of a machine cycle and is open while returning to its starting position during the remainder of each cycle. Roller 8 is assumed to advance the composite tape 1 at a rate of two rows of blisters at a time, in keeping with the operating rhythm of cutting station D producing packages of two rows each. Cover strip 9 is thermally bonded onto the advancing carrier strip 2 by the pressure of counterroller 29 exerted upon radial webs 7b of transport roller 7 surrounding each blister 6.

Figure 6:
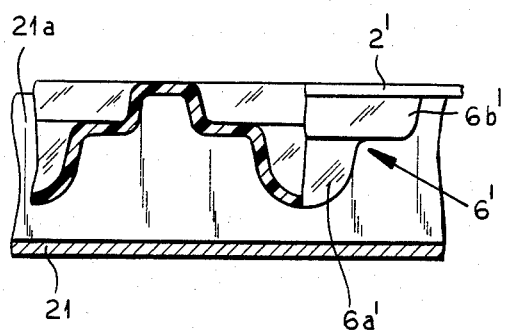
FIG. 6 is a view similar to FIG. 4, illustrating another carrier strip with blisters formed in a different die.
Figure 7:
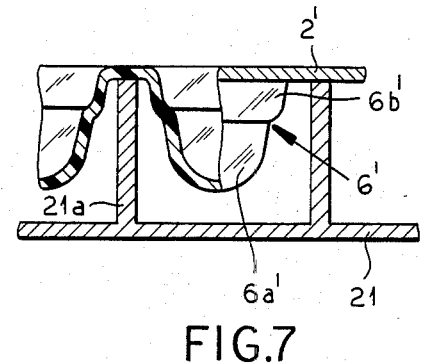
FIG. 7 is a view similar to that of FIG. 5 but relating to the carrier strip of FIG. 6.
Figure 10:
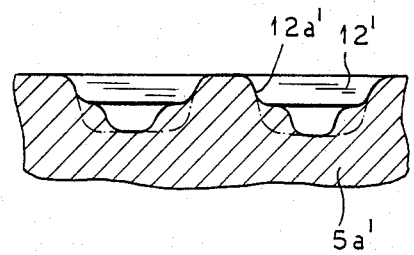
FIG. 10 is a fragmentary cross-sectional view of a modified die for the molding station of FIG. 2.

In FIGS. 6, 7 and 9 I have shown a carrier strip 2' deformed into blisters 6' of smaller volume with the aid of a modified die 5a, FIG. 10, whose cavities 12' have rim zones 12a' identical with zones 12a (FIG. 3) of cavities 12, disposed adjacent the path of carrier strip 2, and recessed away from the deeper parts of the cavity so as to form base portions 6b' of the same generally rectangular configuration as base portions 6b of blisters 6. Cavities 12 and 12' both converge from their rim zones toward their vented bottoms, with only the narrower lower parts 6a' of blisters 6' differing significantly from the corresponding portions 6a of blisters 6. As a result, tape 2' will be entrained just as positively as tape 2 by the transport rollers 7 and 8. From a comparison of FIGS. 5 and 7 it will also be noted that blisters 6 and 6' are guided by ribs 21a with the same relatively limited lateral play.

While it will usually be convenient to use separate dies for making blisters 6 and 6', it is also possible to provide the cavities 12 of die 5a with removable inserts conforming to the shape of the smaller blisters 6', as indicated by phantom lines in FIG. 10.

Whether the different dies referred to above are represented by a plurality of separate bodies or by a single body with inserts selectively receivable in its cavities, the invariable rim zones of these cavities enable the use of the same guide structure 21 and the same transport rollers 7, 8 in the production of blisters of widely varying volumes and shapes.

I claim:

1. In a machine for the production of blister packages, comprising a molding station with a reciprocating die holder adapted to press a preheated thermoplastic carrier strip through a die with at least one cavity onto an abutment plate having a channel opposite said cavity connected to a source of compressed air whereby blisters conforming to said cavity are produced in said carrier strip, a filling station downstream of said molding station having loading means for introducing goods to be packaged into the blisters of said carrier strip, a sealing station downstream of said filling station including a roller means for bonding an overlying cover strip to said carrier strip whereby the blisters thereof are hermetically closed against the atmosphere, and feed means for advancing said carrier strip through said molding, filling and sealing station at a controlled speed, the combination therewith of a die positioned on said die holder and provided with cavities having identical deep central portions surrounded by rim zones which are recessed away from said central portions outwardly, said rim zones being adjacent the path of said carrier strip, forming shoulders with said deep central portions and converging toward cavity bottoms remote from said rim zones that are vented to the atmosphere, said feed means including a transport roller with peripheral indentations having mouths whose outlines substantially correspond to those of the rim zones of said cavities for closely surrounding base portions of blisters formed in said cavities, said roller means including a counterroller coacting with said transport roller for compressing said carrier and cover strips therebetween during positive entrainment of said carrier strip by said transport roller, said die being removable from said die holder for replacement by another die differing therefrom only in the configuration of its cavities at locations adjoining said rim zones.

2. The combination defined in claim 1 wherein said rim zones are of generally rectangular outline.

3. The combination defined in claim 1 or 2 wherein said cavities are disposed in an orthogonal array with a plurality of rows paralleling the direction of advance of said carrier strip.

4. The combination defined in claim 3, further comprising a set of guide ribs supporting said carrier strip between said molding and sealing stations, said guide ribs extending parallel to the direction of advance and lying between the base portions of adjacent rows of blisters arrayed on said carrier strip.

* * * * *